(12) United States Patent
Kim et al.

(10) Patent No.: US 11,205,404 B2
(45) Date of Patent: Dec. 21, 2021

(54) INFORMATION DISPLAYING METHOD AND ELECTRONIC DEVICE THEREFOR

(71) Applicant: Samsung Electronics Co., Ltd., Gyeonggi-do (KR)

(72) Inventors: Gounyoung Kim, Gyeonggi-do (KR); Heejung Jung, Gyeonggi-do (KR); Soonyeon Choi, Gyeonggi-do (KR); Youngkyoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/968,645

(22) PCT Filed: Feb. 14, 2019

(86) PCT No.: PCT/KR2019/001804
§ 371 (c)(1),
(2) Date: Aug. 10, 2020

(87) PCT Pub. No.: WO2019/164179
PCT Pub. Date: Aug. 29, 2019

(65) Prior Publication Data
US 2020/0410962 A1 Dec. 31, 2020

(30) Foreign Application Priority Data
Feb. 21, 2018 (KR) ........................ 10-2018-0020625

(51) Int. Cl.
*G09G 5/377* (2006.01)
*G09G 3/00* (2006.01)
*G09G 5/38* (2006.01)

(52) U.S. Cl.
CPC ............. *G09G 5/377* (2013.01); *G09G 3/003* (2013.01); *G09G 5/38* (2013.01);
(Continued)

(58) Field of Classification Search
CPC .......... G09G 5/377; G09G 3/003; G09G 5/38; G09G 2320/066; G09G 2320/0666;
(Continued)

(56) References Cited

U.S. PATENT DOCUMENTS 8,823,603 B1 9/2014 Kim et al.
2013/0322844 A1 12/2013 Suzuki et al.
(Continued)

FOREIGN PATENT DOCUMENTS

EP 2669866 A2 12/2013
EP 3112985 A1 1/2017
(Continued)

OTHER PUBLICATIONS

European Search Report dated Oct. 30, 2020.

*Primary Examiner* — Antonio A Caschera
(74) *Attorney, Agent, or Firm* — Cha & Reiter, LLC

(57) ABSTRACT

An electronic device including a display, a memory, and a processor operatively connected to the display and the memory. The processor may be configured to: display a partial image, corresponding to a view area to be watched, in an omnidirectional image stored in the memory, on the display; select a display attribute on the basis of the distance between the view area and an area of interest in the omnidirectional image; and display additional information associated with the area of interest, on the display on the basis of the selected display attribute. Various other embodiments found through the specification are also possible.

20 Claims, 14 Drawing Sheets

(52) U.S. Cl.
CPC ............. *G09G 2320/066* (2013.01); *G09G 2320/0666* (2013.01); *G09G 2320/0686* (2013.01); *G09G 2340/045* (2013.01); *G09G 2340/06* (2013.01); *G09G 2340/12* (2013.01)

(58) Field of Classification Search
CPC ..... G09G 2320/0686; G09G 2320/045; G09G 2340/06; G09G 2340/12; G06T 2207/30261; H04N 13/332; G06K 9/00362; G06K 9/00805
See application file for complete search history.

(56) References Cited

U.S. PATENT DOCUMENTS

| | | | |
|---|---|---|---|
| 2016/0065929 | A1 | 3/2016 | Barcons-Palau et al. |
| 2016/0217623 | A1* | 7/2016 | Singh ................ G09G 3/003 |
| 2017/0026577 | A1 | 1/2017 | You et al. |
| 2017/0103535 | A1 | 4/2017 | Mathsyendranath et al. |
| 2017/0262961 | A1* | 9/2017 | Ekambaram .......... G09G 5/346 |
| 2018/0278916 | A1 | 9/2018 | Kim et al. |
| 2018/0321798 | A1 | 11/2018 | Kawamura |
| 2020/0125244 | A1* | 4/2020 | Feinstein ............ G06F 3/04883 |

FOREIGN PATENT DOCUMENTS

| | | |
|---|---|---|
| JP | 2012-173858 A | 9/2012 |
| KR | 10-2015-0012972 A | 2/2015 |
| KR | 10-2017-0017700 A | 2/2017 |
| KR | 10-1761487 B1 | 8/2017 |
| KR | 10-2018-0016805 A | 2/2018 |
| WO | 2014/110632 A1 | 6/2014 |

\* cited by examiner

INFORMATION DISPLAYING METHOD AND ELECTRONIC DEVICE THEREFOR

CROSS REFERENCE TO RELATED APPLICATIONS

This application is a National Phase Entry of PCT International Application No. PCT/KR2019/001804, which was filed on Feb. 14, 2019, and claims a priority to Korean Patent Application No. 10-2018-0020625, which was filed on Feb. 21, 2018, the contents of which are incorporated herein by reference.

TECHNICAL FIELD

Various embodiments disclosed in this specification relate to a method for displaying information and an electronic device therefor.

BACKGROUND ART

To improve the user experience and immersion, pieces of content including 360-degree images have been produced. For example, the 360-degree image may be an image including an omnidirectional image. A viewer may watch an image corresponding to the desired direction by changing a viewing region of the 360-degree image. For example, the viewer may change the viewing region based on a navigation interface, a gaze change, or an input (e.g., a drag input) to a screen.

Because the 360-degree image includes an omnidirectional image, the viewer may perform an operation of changing the viewing region to watch an event in a region outside the viewing region.

DISCLOSURE

Technical Problem

To instruct a viewer to generate an event, an electronic device may indicate that the event has occurred, through a subtitle, or the like. For example, a subtitle such as "look behind" may be displayed on an image in a direction opposite to the direction where which the event has occurred. These subtitles may be provided to have a form in which the subtitles are merged with the 360-degree image at a fixed location. The event may occur at a fixed location, but the location of the event may be changed over time. Also, it may be difficult for the viewer to find a direction in which the event occurs, based on the subtitles within the 360-degree image.

Various embodiments disclosed in the specification provide a method and electronic device that may solve the above-described problems and may improve a user experience.

Technical Solution

According to an embodiment disclosed in this specification, an electronic device may include a display, a memory, and a processor electrically and operatively connected to the display and the memory. The processor may be configured to display a partial image corresponding to a viewing region in an omnidirectional image stored in the memory, on the display, to select a display attribute based on a distance between a region of interest (RoI) and the viewing region of the omnidirectional image, and to display additional information associated with the RoI on the display based on the selected display attribute.

Furthermore, according to an embodiment disclosed in this specification, an additional information displaying method of an electronic device may include displaying a partial image corresponding to a viewing region in an omnidirectional image stored in a memory of the electronic device, on a display of the electronic device, selecting a display attribute based on a distance between an RoI and the viewing region of the omnidirectional image, and displaying additional information associated with the RoI on the display based on the selected display attribute.

Moreover, according to an embodiment disclosed in this specification, an electronic device may include a display, a processor operatively connected to the display, and a memory operatively connected to the processor. The memory may store instructions that, when executed, cause the processor, to display a partial image corresponding to a viewing region in an omnidirectional image stored in the memory, on the display, to select a display attribute based on a distance between an RoI and the viewing region of the omnidirectional image, and to display additional information associated with the RoI on the display based on the selected display attribute.

Advantageous Effects

According to various embodiments disclosed in the specification, it is possible to increase a user's immersion by providing dynamic additional information about region of interest (RoI).

Furthermore, according to various embodiments, it is possible to increase a user experience by providing additional information based on the distance between a viewing region and RoI.

Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Hereinafter, various embodiments of this specification may be described with reference to accompanying drawings. Embodiments and terms used herein are not intended to limit the technologies described in the disclosure to specific embodiments, and it should be understood that the embodiments and the terms include modification, equivalent, and/or alternative on the corresponding embodiments described herein.

Figure 1:
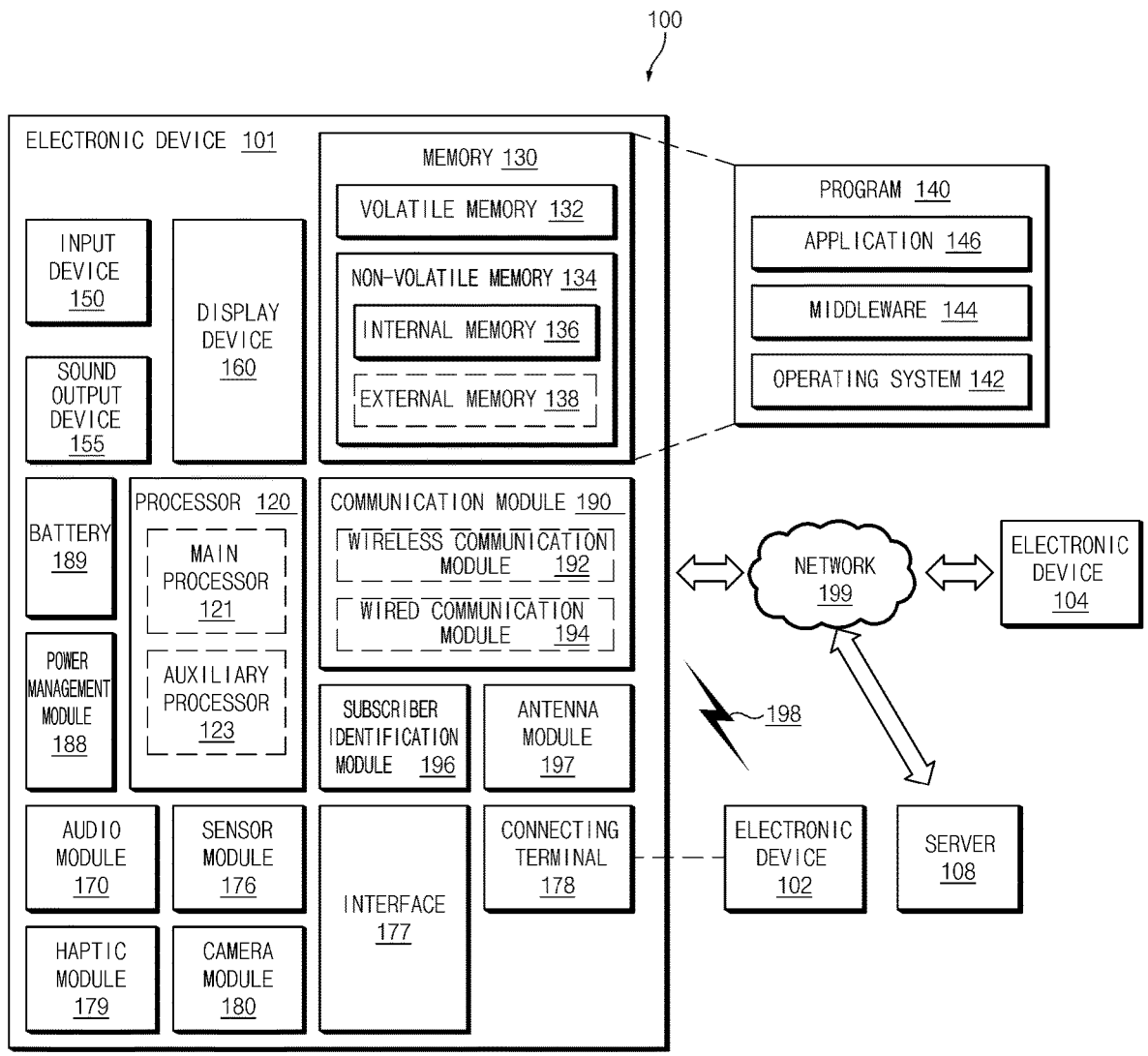
FIG. 1 illustrates a block diagram of the electronic device in a network, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments described below, the electronic device 101 may include at least one of a portable communication device (e.g., a smart phone), a computer device, a portable multimedia device, a portable medical device, a camera, a wearable device, a headset or a form factor that supports a virtual reality (VR) function, or a home appliance device. Various operations of the electronic device 101 described below may be performed by the processor 120. For example, the processor 120 may control the operations of the electronic device 101 based on instructions stored in the memory 130.

Figure 2:
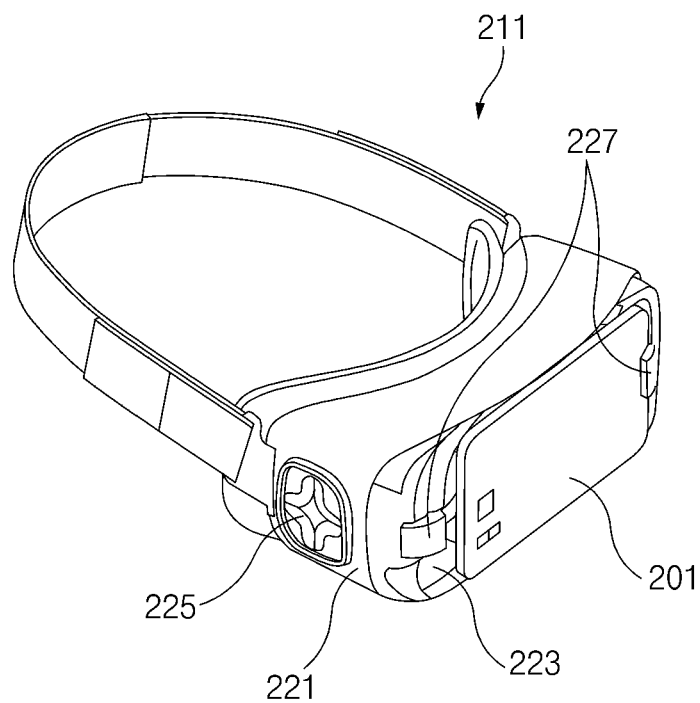
FIG. 2 is a diagram illustrating an operating environment of an electronic device according to various embodiments.

FIG. 2 is a diagram illustrating an operating environment 211 of an electronic device according to various embodiments.

According to various embodiments, the operating environment 211 of an electronic device 201 (e.g., the electronic device 101 in FIG. 1) may include the electronic device 201 and a head mounted display (HMD) device 221 (e.g., the electronic device 102 of FIG. 1).

According to various embodiments, the electronic device 201 may be operated by interacting with the HMD device 221. According to an embodiment, the electronic device 201 may be fastened to the HMD device 221. For example, the electronic device 201 may be detachably fastened to the HMD device 221, using at least one fastening member 227 provided on a front frame 223 of the HMD device 221.

According to various embodiments, the electronic device 201 may include a display (e.g., the display device 160 of FIG. 1) for providing a user with at least visual content (e.g., a video or an image). The electronic device 201 may be fastened to the HMD device 221 such that the display of the electronic device 201 faces the front frame 223 of the HMD device 221. For example, the user may watch content being played on the display of the electronic device 201, through a lens assembly (not illustrated) included on the front frame 223 of the HMD device 221.

According to various embodiments, the electronic device 201 may include an interface 225 for receiving a user input. For example, the electronic device 201 may perform specified operations based at least on an input received through the interface 225.

According to various embodiments, the electronic device 201 may display an image depending on a uniocular mode (e.g., a function to output a single screen in a single display region) or a binocular mode (e.g., a function to divide a single display region into a plurality of regions, and to respectively output the same or different screens to the divided regions). When the electronic device 201 outputs content based on the binocular mode, the user may watch virtual reality (VR) or augmented reality (AR) content through the HID device 221.

In FIG. 2, according to an embodiment, the electronic device 201 may be a mobile device. For example, the electronic device 201 may be a mobile phone, a smartphone, a tablet PC, a digital camera, a camcorder, a laptop computer, an e-book terminal, a digital broadcasting terminal, a personal digital assistant (PDA), and a portable multimedia player (PMP), a navigation device, an MP3 player, or a wearable device. According to an embodiment, the electronic device 201 may be an electronic device such as a desktop PC or a TV. The shape of the electronic device 201 is not limited to the above-described examples. For example, the electronic device 201 may be an arbitrary electronic device including a display. According to an embodiment, the electronic device 201 may include a flat surface or a curved display having a specified curvature. For example, the electronic device 201 may include a flexible display. For example, the electronic device 201 may display an image with high definition (HD), Full HD, Ultra HD, or a resolution clearer than Ultra HD.

Figure 3:
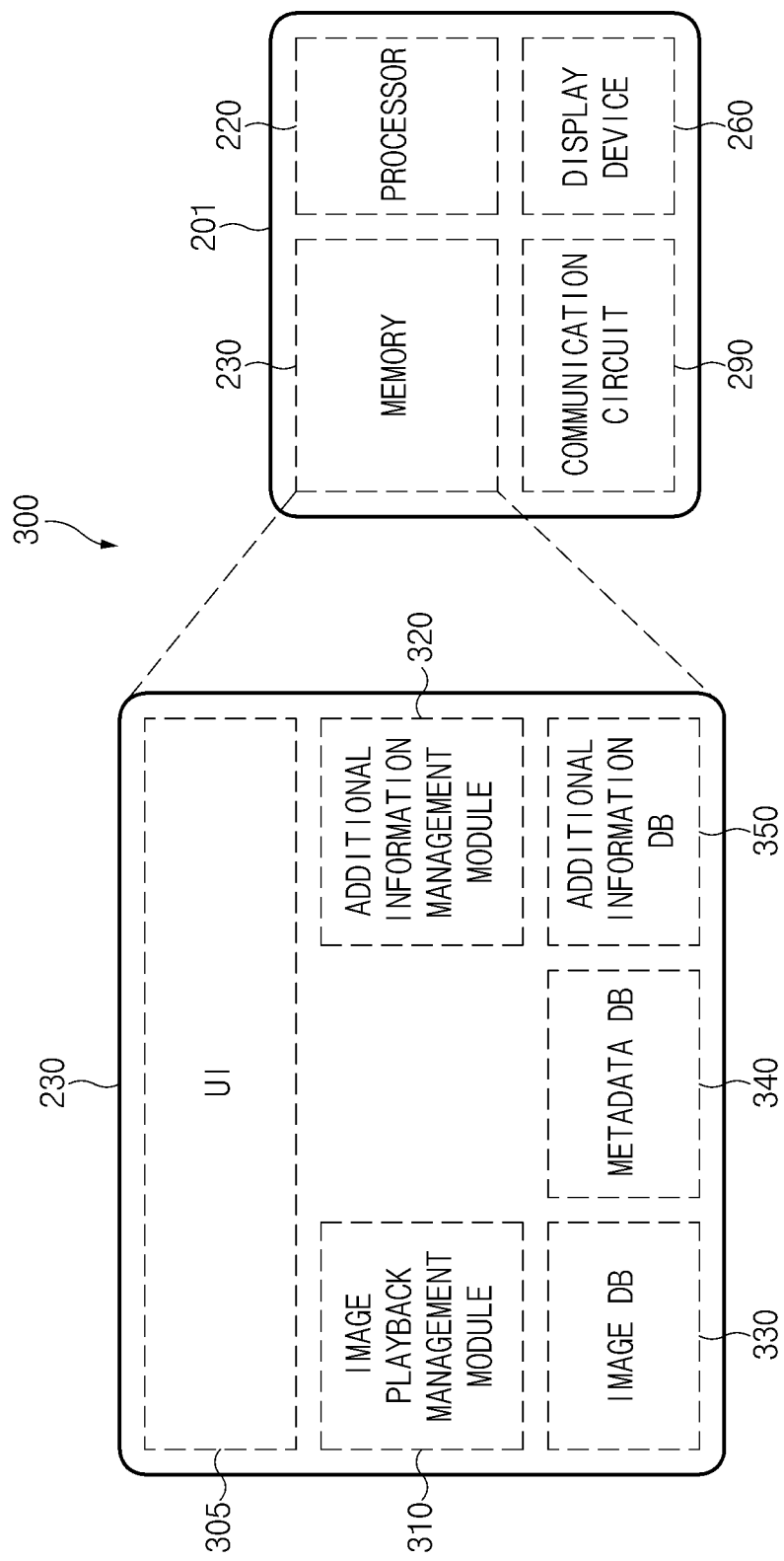
FIG. 3 is a block diagram of an electronic device, according to various embodiments.

FIG. 3 is a block diagram 300 of the electronic device 201 according to various embodiments.

According to various embodiments, the electronic device 201 (e.g., the electronic device 101 in FIG. 1) may include a processor 220 (e.g., the processor 120), a memory 230, (e.g., the memory 130), a display device 260 (e.g., the display device 160), and a communication circuit 290 (e.g., the communication module 190). For example, the processor 220 may be electrically or operatively connected to the memory 230, the display device 260, the communication circuit 290, and other configurations not illustrated in FIG. 3. The configuration of the electronic device 201 of FIG. 3 is exemplary, and the electronic device 201 may further include other configurations not illustrated in FIG. 3.

According to various embodiments, the processor 220 may control other configurations of the electronic device 201 (e.g., the memory 230, the display device 260, and the communication circuit 290). For example, the processor 220 may control other configurations based on instructions stored in the memory 230. According to various embodiments, the processor 220 may be composed of a plurality of processors. For example, the processor 220 may include a dedicated processor for image processing. For example, the processor 220 may be implemented with one or more chips.

In the following embodiments, the entire image may refer to an image viewable in all directions or a plurality of directions or an image having an original image larger than an output image. For example, the entire image may be called an omnidirectional image, a 360-degree image, an immersive image, or a panoramic image.

In the following embodiments, the recommended viewing angle may refer to a direction to a specific region where viewing is recommended to viewers at a specific time. For example, the recommended viewing angle may be set by a content producer or may be set based on a specified algorithm.

In the following embodiments, point of observation may refer to the center point at which the entire image is observed or captured. For example, the point of observation may refer to the center point at which the entire image is rendered.

In the following embodiments, RoI may refer to a region in which viewers are likely to be interested, or a region in which viewers are intended to be interested. For example, RoI may include at least one point of interest (PoI). According to an embodiment, RoI may have a specified shape (e.g., a circle, a triangular rectangle, a rhombus, and/or a polygon) or a shape of an object corresponding to RoI. According to various embodiments, RoI and/or PoI may be set by a content producer. According to various embodiments, RoI and/or PoI may be set based on a specified algorithm. For example, RoI may be set based on the identification of an object (e.g., a face, vehicle, animal, and/or plant) and/or a background (a mountain, sea and/or night view). For example, the object and/or background may be identified based on singularity identification and/or edge identification.

In the following embodiments, the projection layer may refer to a three-dimensional (3D) model for projecting the entire image into a 3D space for playing the entire image. For example, the projection layer may be a mesh layer composed of coordinate values in the 3D space. For example, the projection layer may be a sphere. According to various embodiments, the electronic device 201 may map or project the entire image on the projection layer and may display a partial image corresponding to the viewing direction on the display device 260.

According to various embodiments, information about the recommended viewing angle, point of observation, RoI, and/or PoI may be included in the metadata for the entire image.

According to various embodiments, the memory 230 may include a user interface 305, an image playback management module 310, an additional information management module 320, an image database (DB) 330, a metadata DB 340, and an additional information DB 350.

According to various embodiments, the user interface 305 may receive user input, may transmit data to the image playback management module 310 and the additional information management module 320, and may receive data from the image playback management module 310 and the additional information management module 320. According to an embodiment, the user interface 305 may receive data from the image DB 330, the metadata DB 340, and the additional information DB 350, and may process the received data.

According to various embodiments, the image playback management module 310 may obtain the entire image from the image DB 330 and may map the entire image onto the first projection layer. For example, the first projection layer may be generated by the image playback management module 310. For example, the image playback management module 310 may use a specified first projection layer. According to an embodiment, the image playback management module 310 may obtain additional information from the additional information management module 320 and may map the additional information onto a second projection layer. For example, the second projection layer may be displayed to be smaller than the first projection layer, or to be closer to a viewer than the first projection layer.

According to various embodiments, the image playback management module 310 may change the display attribute of the additional information, based on the distance between the viewing region and RoI. For example, when the distance between the viewing region and the RoI is less than the specified distance, the image playback management module 310 may apply a first display attribute to the additional information; when the distance between the viewing region and the RoI is equal to or greater than the specified distance, the image playback management module 310 may apply a second display attribute to the additional information.

According to various embodiments, the image playback management module 310 may render an image mapped onto at least one projection layer. For example, rendering may include rendering the first image and the associated additional information as a 3D image (e.g., a left-eye image and a right-eye image).

According to various embodiments, the additional information management module 320 may obtain the additional information from the additional information DB 350 and may provide the additional information to the image playback management module 310. For example, the additional information management module 320 may provide the image playback management module 310 with the additional information corresponding to RoI information stored in the metadata DB 340.

According to various embodiments, the image DB 330 may store various image data including the entire image. For example, the image DB 330 may obtain image data from an external server (e.g., the server 108 in FIG. 1) or an external electronic device (e.g., the electronic device 102 or 104 in FIG. 1). For example, the image data may be streamed or downloaded from the external server or the external electronic device.

According to various embodiments, the metadata DB 340 may store metadata associated with an image. For example, the metadata may include information about RoI, PoI, a point of observation, a recommended viewing angle, and/or a projection layer. For example, the metadata may be received from the external server or the external electronic device.

According to various embodiments, metadata may include at least one of at least one view port information, PoI information, RoI information, or event information. According to various embodiments, metadata may be dynamically changed for each frame or sample. According to an embodiment, the view port information may include a view port identifier, view port display position information (e.g., information about the position of at least one corner in the viewing region) of a view port, or view port size information (e.g., width and height information), with respect to at least one view port. According to an embodiment, PoI information may include at least one of a PoI identifier or PoI location information (e.g., PoI yaw and/or PoI pitch), with respect to at least one Pot According to an embodiment, RoI information may include at least one of information about field of view, an RoI identifier, RoI start position information (e.g., start pitch and yaw), or RoI end position information (e.g., end pitch and yaw) with regard to at least one RoI. According to an embodiment, event information may include at least one of an event identifier, an event time, or an event location (e.g., pitch and yaw) with respect to at least one event.

According to various embodiments, the additional information DB 350 may store additional information associated with RoI, PoI, and/or recommended viewing angle. For example, the additional information may include texts, images, icons, and/or voice. For example, the additional information may be received from the external server or the external electronic device.

According to various embodiments, the processor 220 may control the display device 260 to display an image corresponding to a viewing region in the entire image stored in the memory 230. For example, the image may include the additional information about RoI or RoI.

According to various embodiments, the electronic device 201 may include a display (e.g., the display device 260), the memory 230, and the processor 220 operatively connected to the display 260 and the memory 230. According to an embodiment, the processor 220 may be configured to display a partial image corresponding to a viewing region in an omnidirectional image stored in the memory, on the display 260, to select a display attribute based on a distance between a region of interest (RoI) and the viewing region of the omnidirectional image, and to display additional information associated with the RoI on the display 250 based on the selected display attribute.

According to various embodiments, the processor 220 may be configured to select a first display attribute when the distance between the viewing region and the RoI is equal to or greater than a specified distance, and to select a second display attribute different from the first display attribute when the distance between the viewing region and the RoI is less than the specified distance. The second display attribute may be different from the first display attribute in at least one of brightness, a transparency, contrast, color tone, color space, color, a shape, or size. For example, the second display attribute may be different in information amount from the first display attribute.

According to an embodiment, the processor 220 may be configured to obtain information about the RoI and the additional information from metadata of the omnidirectional image.

According to an embodiment, the processor 220 may be configured to map the omnidirectional image onto a first layer and map the additional information onto a second layer. A depth of the first layer may be different from a depth of the second layer. For example, the first layer and the second layer may be spherical layers. According to an embodiment, the processor 220 may be configured to obtain the distance between the RoI and the viewing region, based at least on an angle between a first normal line of the RoI and a second normal line of the viewing region.

According to an embodiment, the additional information may include a shrunk image of the RoI.

Figure 4:
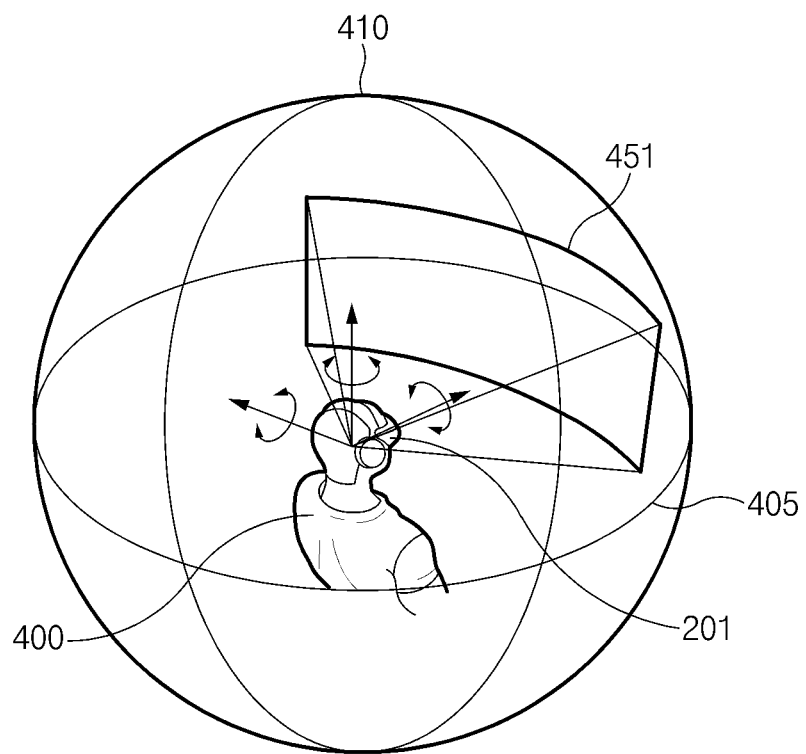
FIG. 4 illustrates an image display method of an electronic device according to various embodiments.

According to an embodiment, the processor 220 may be configured to display the additional information in the viewing region before a time of occurrence of the RoI, when the distance between the RoI and the viewing region is equal to or greater than a specified second distance. For example, the additional information displayed before the time of the occurrence of the RoI may include information indicating the time of the occurrence of the RoI and a direction of the RoI. FIG. 4 illustrates an image display method of an electronic device according to various embodiments.

Referring to FIG. 4, according to various embodiments, the electronic device 201 may map or project the entire image onto a specified 3D model (e.g., a projection layer 410). For example, an electronic device may map or project an image onto a spherical model. For example, the projection layer 410 may be a spherical mesh. According to an embodiment, the electronic device 201 may stitch a plurality of images and may map or project the stitched image onto the projection layer 410.

According to various embodiments, the electronic device 201 may display at least part of the image mapped onto the projection layer 410, on the display device 260. For example, the electronic device 201 may display a viewing region 451 corresponding to the gaze of a user 400, on the display device 260. For example, the electronic device 201 may assume that the user 400 is located at the center of a first circle 405. According to an embodiment, the electronic device 201 may detect the gaze direction of a wearer by detecting the direction and/or slope of the electronic device 201, using a sensor module (e.g., the sensor module 176 of FIG. 1). For example, the electronic device 201 may detect the direction and/or tilt of the electronic device 201, using a gyro sensor and/or an acceleration sensor. According to an embodiment, the electronic device 201 may set the viewing region 451 by detecting the roll, yaw, and pitch of the electronic device 201.

According to various embodiments, the electronic device 201 may provide image content (e.g., 360-degree image) having a viewing angle, which is equal to or greater than a viewing angle capable of being displayed on the display device 260. For example, the user 400 may change the viewing region 451 of content being played, through changing the direction and/or slope of the electronic device 201 or the interface 225 for receiving an input.

According to various embodiments, to construct a virtual space, the electronic device 201 may display at least one 3D image in the viewing region 451. For example, the 3D image may include at least one of a background image, at least one object, or a 2D image having a depth.

Figure 5:
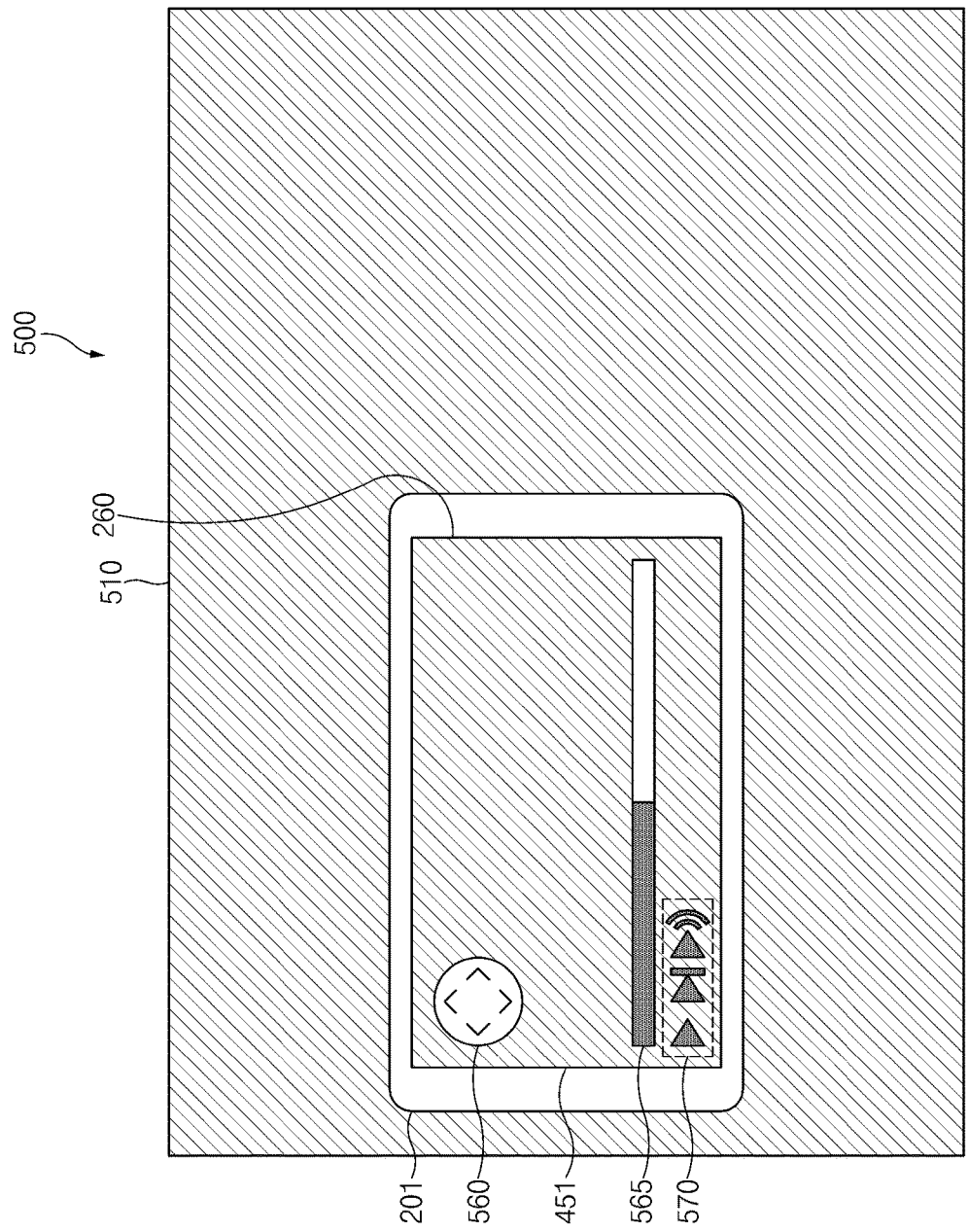
FIG. 5 illustrates an example of image display of an electronic device according to various embodiments.

FIG. 5 illustrates an example 500 of image display of an electronic device according to various embodiments.

Referring to FIG. 5, according to various embodiments, the electronic device 201 may display an image corresponding to the viewing region 451 of an entire image 510, on the display device 260. For example, the entire image 510 may be represented as a shape in which an image mapped or projected onto a specified 3D model (e.g., the projection layer 410 of FIG. 4) is planar.

According to various embodiments, the electronic device 201 may provide the display device 260 with a user interface 560 for controlling a viewing direction. For example, the viewer may change the viewing region 451 through an input to the user interface 560. For another example, the electronic device 201 may control a viewing direction based on a user input (e.g., a drag input) to the display device 260.

According to various embodiments, the electronic device 201 may display a time bar 565 for controlling the time of the entire image 510 or the viewing region 451. According to an embodiment, the electronic device 201 may display an interface 570 for controlling the playback of the entire image 510 or viewing region, on the display device 260.

Hereinafter, embodiments in which various pieces of additional information of the electronic device 201 are displayed will be described. Hereinafter, an additional information displaying method will be described based on an image mapped onto a 3D model, such as the projection layer 410 of FIG. 4. However, an additional information displaying method according to an embodiment of the disclosure is not limited thereto. For example, as illustrated in FIG. 5, the embodiments described below may be applied to a planar image. The following embodiments may be performed by an arbitrary electronic device (e.g., the electronic device 201) that displays a part of the entire image 510.

Figure 6:
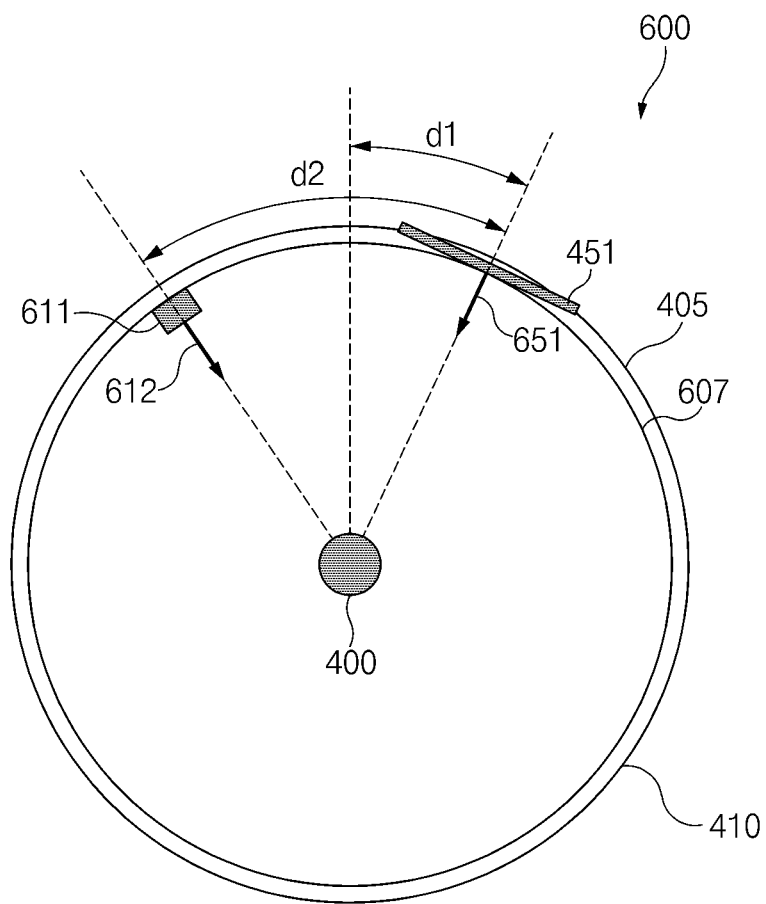
FIG. 6 is a top view illustrating a location of an RoI according to various embodiments.

FIG. 6 is a top view 600 illustrating a location of an RoI 611 according to various embodiments.

For example, the top view 600 of FIG. 6 may correspond to the top view of a sectional view obtaining by taking the projection layer 410 of FIG. 4 along the first circle 405. In FIG. 6, the electronic device (e.g., the electronic device 201 in FIG. 3) may not be illustrated, but may be worn by the user 400, as illustrated in FIG. 4.

According to various embodiments, the electronic device 201 may display an image corresponding to the viewing region 451 in the entire image mapped onto the projection layer 410, on the display device 260. For example, the electronic device 201 may display an image on the display device 260 based on a user input.

According to various embodiments, the electronic device 201 may map the RoI 611 on an RoI layer 607. For example, the electronic device 201 may obtain information about the RoI 611, from metadata for the entire image. According to an embodiment, the RoI layer 607 may have a size smaller than the projection layer 410. For example, the RoI layer 607 may have a diameter smaller than the projection layer 410. According to an embodiment, the additional information mapped onto the RoI layer 607 may be set to be imaged at a distance closer to the user 400 than the image mapped onto the projection layer 410. For example, the additional information mapped onto the RoI layer 607 and an image mapped onto the projection layer 410 may have different depths.

According to various embodiments, the electronic device 201 may change the display attribute of additional information associated with the RoI 611, based on the distance between the RoI 611 and the viewing region 451. For example, when a distance d2 between the RoI 611 and the viewing region 451 is equal to or greater than a specified critical distance d1, the electronic device 201 may display the additional information in the viewing region 451 based on the first display attribute. For example, when the distance d2 between the RoI 611 and the viewing region 451 is less than a specified critical distance d1, the electronic device 201 may display the additional information in the viewing region 451 based on the second display attribute.

According to various embodiments, the display attribute of additional information may include at least one of brightness, contrast, a transparency, sharpness, color tone, color space, an information amount, a shape, size, and/or a display location.

According to an embodiment, the first display attribute may include transparency higher than the second display attribute. For example, the electronic device 201 may reduce transparency as the distance between the RoI 611 and the viewing region 451 is reduced.

According to an embodiment, the first display attribute may include the brightness, contrast, sharpness, and/or color tone lower than the second display attribute. For example, the electronic device 201 may increase the brightness, contrast, sharpness, and/or color tone as the distance between the RoI 611 and the viewing region 451 is reduced.

According to an embodiment, the first display attribute may include an amount of information less than the second display attribute. For example, when the additional information is displayed depending on the first display attribute, a part of the additional information displayed depending on the second display attribute may be omitted. For example, when the part of the additional information is omitted depending on the first display attribute, the electronic device 201 may display an indicator (e.g., suspension periods (e.g., ellipsis)) indicating the omission of the part of the additional information, in the viewing region 451.

According to an embodiment, the first form of additional information displayed depending on the first display attribute may be different from the second form of additional information displayed depending on the second display attribute. For example, the first form and the second form may have a form capable of indicating the direction of the RoI 611. For example, the first form may have a form indicating a distance greater than the second form. For example, the first form may have a form having directionality; the second form may not have the directionality.

According to an embodiment, the size of additional information displayed depending on the first display attribute may be smaller than the size of additional information displayed depending on the second display attribute. For example, as the distance between the RoI 611 and the viewing region 451 decreases, the electronic device 201 may increase the display size of the additional information.

According to an embodiment, the location of additional information displayed depending on the first display attribute may be different from the location of additional information displayed depending on the second display attribute. For example, when the RoI 611 is not displayed in the viewing region 451, the electronic device 201 may display the additional information in at least part of the viewing region 451 adjacent to the RoI 611, depending on a first display attribute. For example, when the RoI 611 is displayed in the viewing region 451, the electronic device 201 may display the additional information in a location adjacent to the RoI 611, depending on a second display attribute.

In the above-described embodiments, a change in the display attribute of the distance-based additional information may be applied to at least part of the additional information. According to an embodiment, the electronic device 201 may display the first part of the additional information as the first display attribute or the second display attribute based on the distance and may display the remaining additional information independently of the distance. For example, the electronic device 201 may not change the display attribute of the additional information having a high priority and may change the display attribute of the additional information having a relatively low priority based on a distance.

According to various embodiments, the electronic device 201 may determine a distance between the RoI 611 and the viewing region 451, using various methods. According to an embodiment, the electronic device 201 may determine a distance between the RoI 611 and the viewing region 451 based on coordinates. For example, the distance between the RoI 611 and the viewing region 451 may be the distance between the center point of the RoI 611 and the center point of the viewing region 451. For example, the distance between RoI 611 and the viewing region 451 may be the distance between the PoI of the RoI 611 and the center point of the viewing region 451. For example, the distance between the RoI 611 and the viewing region 451 may be the distance between the location (e.g., a center point, an edge, or PoI of the RoI 611) of the RoI 611 and the location (e.g., a center point or edge of the viewing region 451) of the viewing region 451.

In the above-described embodiments, the distance may be replaced with an angle. For example, the distance between the viewing region 451 and the RoI 611 may be replaced with an angle between the viewing region 451 and the RoI 611. According to various embodiments, the electronic device 201 may change the display attribute of the additional information associated with the RoI 611, based on whether the angle between the direction to the viewing region 451 and the direction to the RoI 611 is equal to or greater than the critical angle (e.g., an angle corresponding to a critical distance d1).

According to an embodiment, the electronic device 201 may determine an angle between the RoI 611 and the viewing region 451, based on a first normal line 612 to the RoI 611 and a second normal line 651 to the viewing region 451. For example, the first normal line 612 may be a normal line for any point in the region on the RoI layer 607 onto which the RoI 611 is mapped, or the region on the projection layer 410 onto which the RoI 611 is mapped. For example, the second normal line 651 may be a normal line at any point in the region on the projection layer 410 onto which the viewing region 451 is mapped.

According to an embodiment, the electronic device 201 may determine the distance between the RoI 611 and the viewing region 451, based at least on the angle between the RoI 611 and the viewing region 451.

In the above-described embodiments, various embodiments have been described based on a single critical distance (or critical angle), but embodiments of the disclosure are not limited thereto. According to various embodiments, a plurality of critical distances (or critical angles) may be set. According to an embodiment, the first critical distance and the second critical distance may be set. For example, when the distance between the RoI 611 and the viewing region 451 is equal to or greater than the first critical distance, the electronic device 201 may display the additional information depending on the first display attribute; when the distance between the RoI 611 and the viewing region 451 is less than the first critical distance and is equal to or greater than the second critical distance, the electronic device 201 may display the additional information depending on the second display attribute; when the distance between the RoI 611 and the viewing region 451 is less than the second critical distance, the electronic device 201 may display the additional information depending on the third display attribute. According to an embodiment, information about a critical distance may be included in metadata of an image or may be a specified value.

According to various embodiments, the electronic device 201 may change the display attribute of the additional information associated with the RoI 611 based on whether the RoI 611 is displayed in the viewing region 451. According to an embodiment, when the RoI 611 is not displayed in the viewing region 451, the electronic device 201 may display the additional information depending on the first display attribute; when the RoI 611 is displayed in the viewing region, the electronic device 201 may display the additional information depending on the second display attribute. According to an embodiment, when the RoI 611 is displayed in the viewing region 451 at the specified ratio or more (e.g., about 50%), the electronic device 201 may display the additional information depending on the second display attribute; when the RoI 611 is displayed in the viewing region 451 at a ratio less than the specified ratio, the electronic device 201 may display the additional information depending on the first display attribute. According to an embodiment, the electronic device 201 may display the additional information depending on the third display attribute when the RoI 611 is located at the center portion of the viewing region 451.

Figure 7:
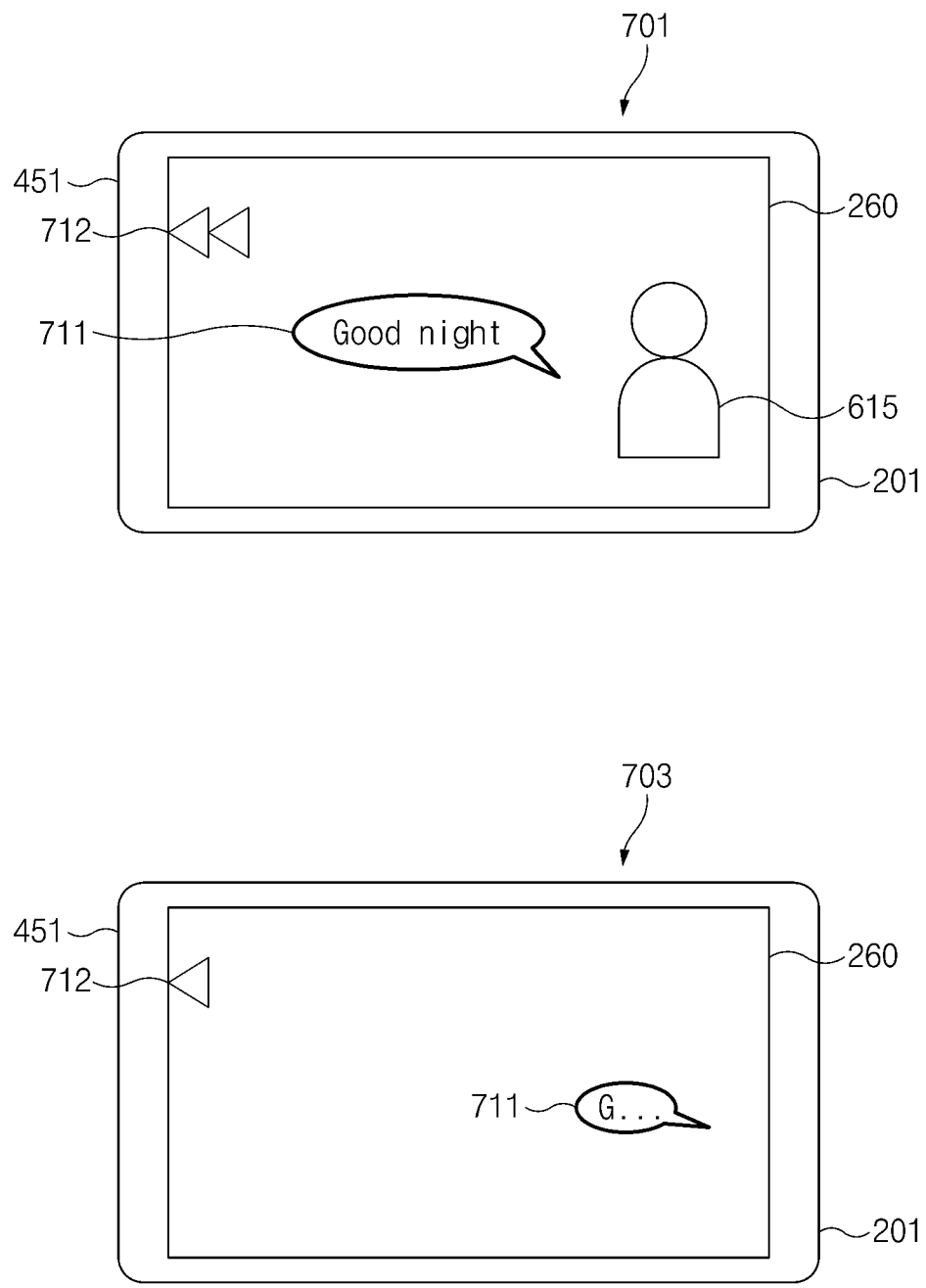
FIG. 7 illustrates a method of displaying additional information according to various embodiments.

FIG. 7 illustrates a method of displaying additional information according to various embodiments.

Referring to FIG. 7, according to various embodiments, the electronic device 201 may change the display attribute of additional information depending on the distance between the viewing region 451 and a first RoI 615.

According to various embodiments, the electronic device 201 may change an amount of information and/or a type of information of first additional information 711, based on the distance between the viewing region 451 (e.g., the center of the viewing region 451) and the first RoI 615.

Referring to an identification number 701, according to various embodiments, the electronic device 201 may display an image corresponding to the viewing region 451 of the omnidirectional image, on the display device 260. For example, the first RoI 615 may be displayed in the viewing region 451. According to an embodiment, the electronic device 201 may display the first additional information 711 associated with the first RoI 615 depending on the first display attribute. For example, the first additional information 711 may be a subtitle (e.g., a speaker's dialogue) associated with the first RoI 615. For example, the electronic device 201 may display the location and additional information of the associated first RoI 615 by displaying the first additional information 711, using a form (e.g., a speech bubble) having the directionality.

Referring to an identification number 703, for example, the first RoI 615 may be located on the right side of the viewing region 451 and may not be displayed on the display device 260. According to an embodiment, the electronic device 201 may display the first additional information 711 associated with the first RoI 615 depending on the second display attribute. For example, the electronic device 201 may display the first additional information 711 based on the second display attribute at a location adjacent to the first RoI 615 of the viewing region 451. For example, the electronic device 201 may display only a part of the first additional information 711. For example, the electronic device 201 may display an indicator indicating that the part of the first additional information 711 has been omitted. For example, the electronic device 201 may reduce the display size of the first additional information 711. For example, the electronic device 201 may indicate the direction of the first RoI 651 by displaying the first additional information 711, using a form (e.g., a speech bubble) having the directionality.

According to an embodiment, the electronic device 201 may change the data type included in the additional information 711, based on the distance between the viewing region 451 and the first RoI 651. For example, when the distance between the viewing region 451 and the first RoI 651 is equal to or greater than a specified distance, or when the first RoI 651 is not displayed in the viewing region 451, the electronic device 201 may display information (e.g., a talker's identifier (e.g., a name)) for identifying the first RoI 651, using the additional information 711.

According to various embodiments, the electronic device 201 may change the shape (e.g., format and/or size) of second additional information 712, based on a distance between the viewing region 451 and the second RoI (not illustrated).

Returning to the identification number 701, according to an embodiment, the electronic device 201 may display the second additional information 712 associated with the second RoI (not illustrated), depending on the second display attribute. For example, the second additional information 712 may be an indicator for indicating the direction of the second RoI (not illustrated). For example, the electronic device 201 may display the direction of the associated second RoI (not illustrated) by displaying the second additional information 712, using a form (e.g., a speech bubble) having the directionality.

Returning to the identification number 703, according to an embodiment, the electronic device 201 may display the second additional information 712 associated with the second RoI (not illustrated), depending on the first display attribute. For example, as compared to the reference numeral 701, the electronic device 201 may indicate that the second RoI (not illustrated) is closer to the viewing region 451, by changing the form of the second additional information 712.

Figure 8:
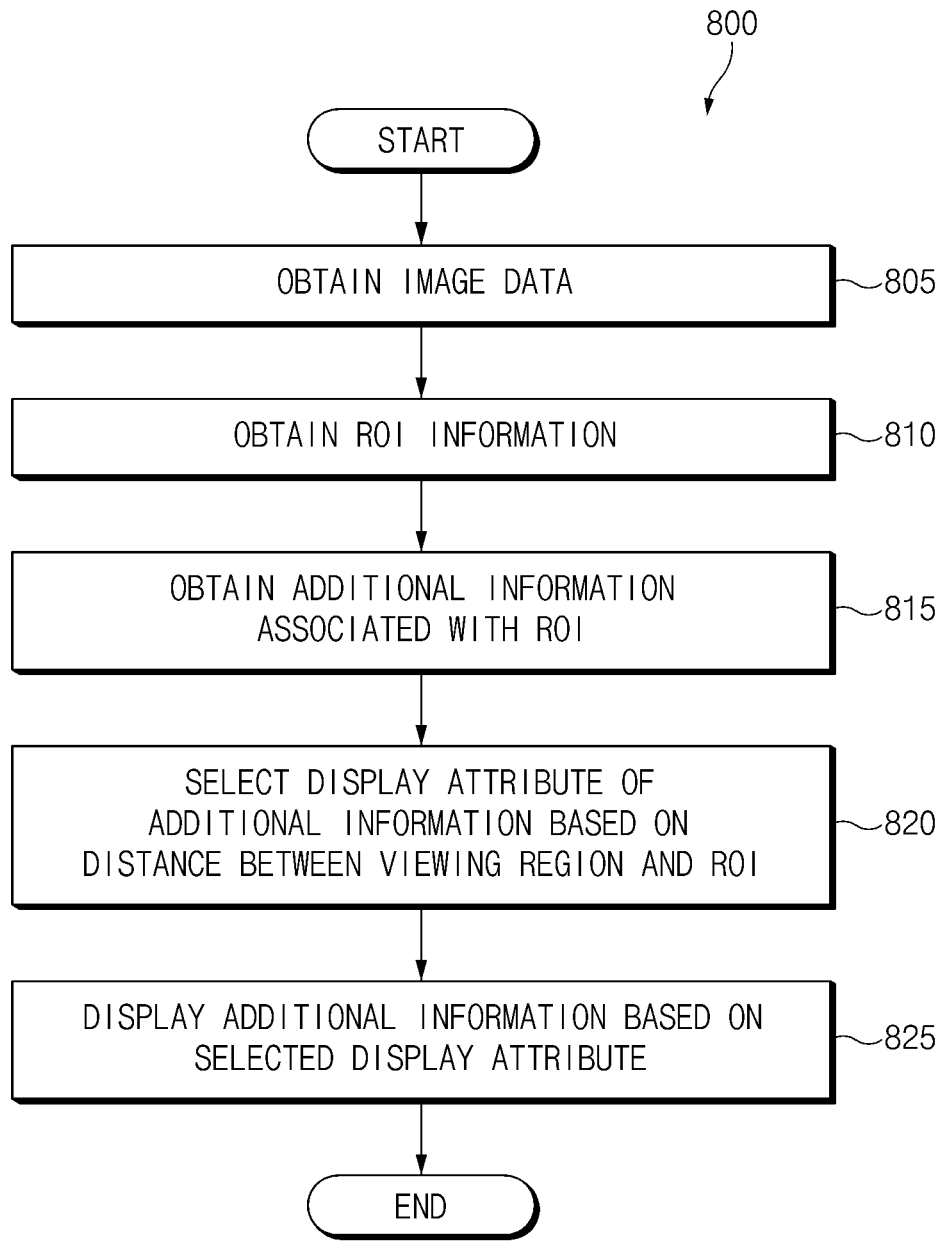
FIG. 8 is a flowchart of a method of displaying additional information according to various embodiments.

FIG. 8 is a flowchart 800 of an additional information displaying method according to various embodiments.

In operation 805, according to various embodiments, the processor 220 of an electronic device (e.g., the electronic device 201 in FIG. 2) may obtain image data. For example, the processor 220 may obtain image data stored in the memory 230. For example, the processor 220 may obtain image data from an external server (e.g., the server 108 of FIG. 1) through the communication circuit 290. For example, the image data may be image data including the above-described entire image (e.g., a 360-degree image).

In operation 810, according to various embodiments, the processor 220 may obtain RoI (e.g., the RoI 611) information. For example, the processor 220 may obtain the RoI information from the memory 230 or the external server. According to an embodiment, the processor 220 may obtain the RoI information from metadata of the image data.

In operation 815, according to various embodiments, the processor 220 may obtain additional information (e.g., the first additional information 711) associated with the RoI. For example, the processor 220 may obtain the additional information from the memory 230 or the external server. According to an embodiment, the processor 220 may obtain the additional information corresponding to an identifier of the RoI information. According to an embodiment, the processor 220 may obtain the additional information by searching (e.g., semantic search or similar search) for information associated with the RoI information.

In operation 820, according to various embodiments, the processor 220 may select a display attribute of the additional information based at least on a distance between a viewing region (e.g., the viewing region 451) and the RoI. According to an embodiment, the display attribute may be preset. According to an embodiment, the display attribute may be included in the metadata of image data. For example, when the distance or angle between the viewing region and the RoI is equal to or greater than a specified distance or a specified angle, the processor 220 may select a first display attribute among a plurality of display attributes; when the distance or angle between the viewing region and the RoI is less than the specified distance or a specified angle, the processor 220 may select a second display attribute.

In operation 825, according to various embodiments, the processor 220 may display the additional information on the display device 260 based on the selected display attribute.

According to an embodiment, the processor 220 may map image data onto a specified first layer (e.g., a mesh layer or the projection layer 410), may map the additional information onto a specified second layer (e.g., a mesh layer or the RoI layer 607) depending on the selected display attribute, may render the mapped image data and the additional information, and thus may display an image and the additional information on the display device 260.

Figure 9:
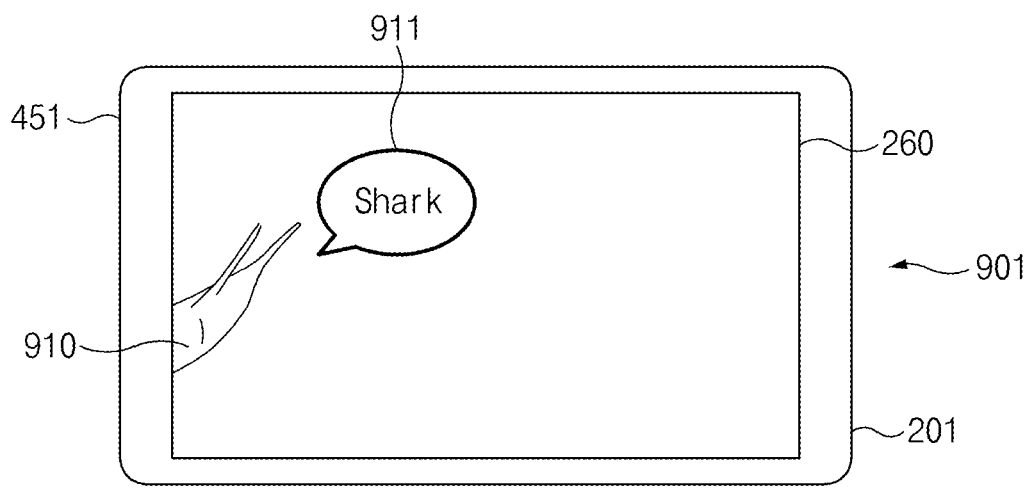
FIG. 9 illustrates examples of displaying additional information according to various embodiments.
Figure 9:
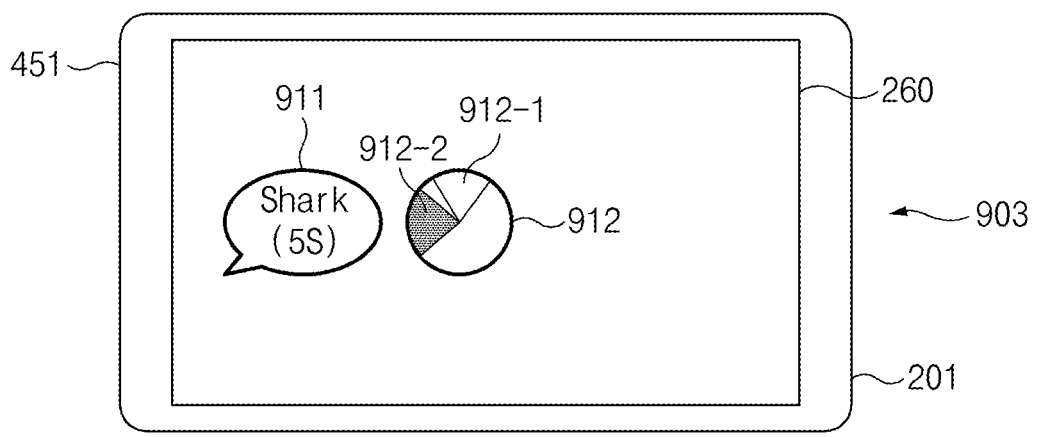
Figure 9:
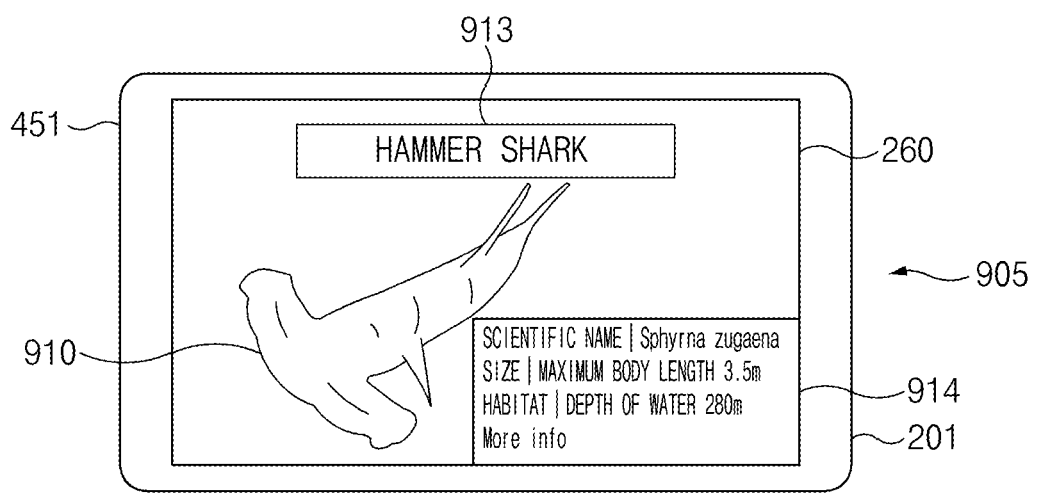

FIG. 9 illustrates examples of displaying additional information according to various embodiments.

According to various embodiments, the electronic device 201 may display an image corresponding to the viewing region 451, on the display device 260. For example, an RoI 910 may be a region corresponding to a specific object (e.g., a shark). For example, reference numerals 901, 903, and 905 may correspond to different fields of view at the same playback time. For another example, the reference numerals 901, 903, and 905 may correspond to different playback times.

Referring to the reference to 901, according to various embodiments, the electronic device 201 may display the viewing region 451 including a part of the RoI 910, on the display device 260. For example, the electronic device 201 may display additional information 911 depending on a second display attribute. According to an embodiment, the electronic device 201 may display the additional information 911 at a location adjacent to the RoI 910. The brief information (e.g., shark) and the location of the RoI 910 may be provided to a user, through the additional information 911. According to an embodiment, the electronic device 201 may maintain the display attribute of the additional information 911 until the distance between the viewing region 451 and the RoI 910 is less than a specified distance.

According to various embodiments, the electronic device 201 may select and display the display attribute of the additional information 911 based on the distance and moving speed of the RoI 910. For example, when at least part of the RoI 910 is located inside the viewing region 451, the electronic device 201 may select and display the display attribute based on the moving speed of the RoI 910. According to an embodiment, when the distance between the viewing region 451 and the RoI 910 is equal to or greater than a specified distance, the electronic device 201 may select a first display attribute; when the distance between the viewing region 451 and the RoI 910 is less than the specified distance, the electronic device 201 may select and display the display attribute depending on the movement speed of the RoI 910. 'For example, when the distance between the viewing region 451 and the RoI 910 is equal to or greater than the specified distance, the electronic device 201 may display additional information 911 according to the first display attribute; when the distance of RoI 910 is less than the specified distance, the electronic device 201 may display the additional information 911 depending on the first display attribute or the second display attribute based on the moving speed of the RoI 910. For example, in the case where the distance between the viewing region 451 and the RoI 910 is less than the specified distance, the electronic device 201 may select the first display attribute when the moving speed (e.g., the number of moving pixels of the RoI 910 during a specified time) of the RoI 910 equal to or greater than the specified speed, and the electronic device 201 may display the additional information 911 by selecting the second display attribute when the moving speed of RoI 910 is less than the specified speed. For example, the moving speed from the viewing region 451 to the RoI 910 may be determined based on the relative moving speed of the RoI 910 for the display region 451.

Referring to the reference number 903, according to various embodiments, the electronic device 201 may display the additional information 911 indicating the direction of the RoI 910, in at least a partial region of the display device 260 depending on the first display attribute. For example, the additional information 911 may include at least one of the name of the RoI 910, the direction of the RoI 910, and information about the time of occurrence of the RoI 910. According to an embodiment, the electronic device 201 may display the additional information 911 before the time of occurrence of the RoI 910. For example, the additional information 911 may include information indicating the time of occurrence of the RoI 910. According to an embodiment, only when the RoI 910 is positioned to be away from the viewing region 451 by a specified distance or more, the electronic device 201 may display the additional information 911 in advance.

Referring to the reference number 903, according to various embodiments, the electronic device 201 may display an indicator 912 for indicating the location of the RoI 910. For example, the indicator 912 may include information indicating a direction 912-2 of the RoI 910 and/or a direction 912-1 of the viewing region 415.

Referring to the reference number 905, according to various embodiments, the electronic device 201 may display first additional information 913 and second additional information 914 based on a third display attribute. For example, the first additional information 913 may include the specific name of the RoI 910. For example, the second additional information 914 may include the detailed information of the RoI 910. According to an embodiment, the electronic device 201 may provide the second additional information 914 with a link (e.g., hyperlink) associated with the RoI 910.

Figure 10:
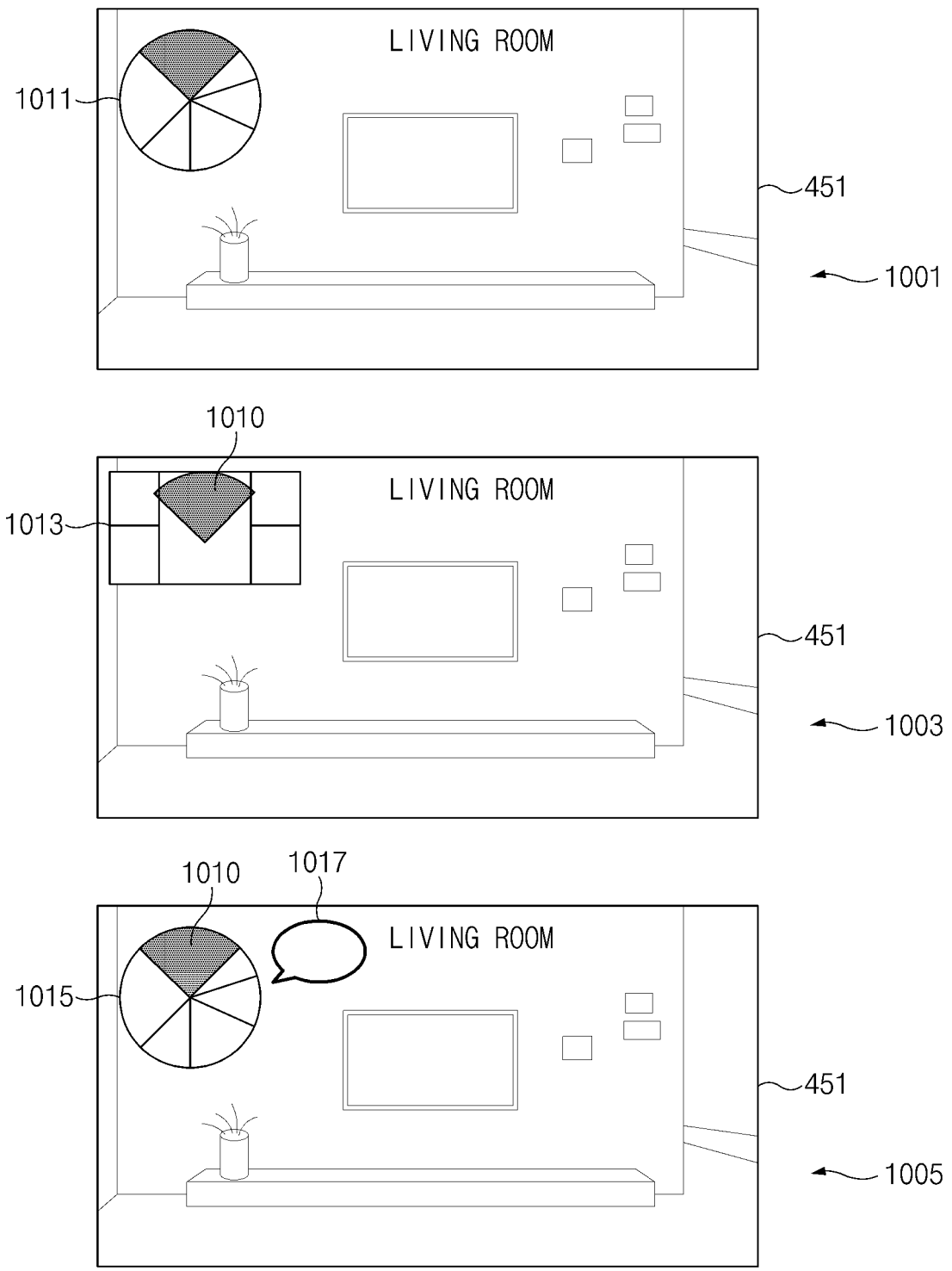
FIG. 10 illustrates examples of an RoI displaying method according to various embodiments.

FIG. 10 illustrates examples of an RoI displaying method according to various embodiments.

According to various embodiments, the electronic device (e.g., the electronic device 201 in FIG. 3) may display an image corresponding to the display region 451, on the display device 260. In the embodiment of FIG. 10, the display region 451 may refer to a part of the entire image.

Referring to a reference number 1001, according to various embodiments, the electronic device 201 may provide at least part of the viewing region 451 with navigation 1011 for guiding an RoI or geographic location. For example, the navigation 1011 may include an indicator 1010 of field of view that indicates the current viewing direction. According to an embodiment, the electronic device 201 may display a direction corresponding to each RoI (e.g., a kitchen, room, and rest room) in the navigation 1011. According to an embodiment, when an event occurs in the corresponding direction or the corresponding RoI direction, the electronic device 201 may indicate the occurrence of an event, using a partial region of the navigation 1011 corresponding to the corresponding direction. For example, the electronic device 201 may indicate the occurrence of an event by flashing a partial region of the navigation 1011 corresponding to the corresponding direction or by changing a display attribute. For example, the event may be the presence of additional information (e.g., area and facility introduction) associated with an RoI. According to an embodiment, the electronic device 201 may change the display attribute of a partial region of the navigation 1011 corresponding to the RoI at an output time of the additional information about a specific RoI or at a time before a specified time from the output time.

Referring to a reference number 1003, according to various embodiments, the electronic device 201 may display navigation 1013 in a form corresponding to a real space (e.g., a top view). For example, at least one of the form or display position of the navigation 1013 may be included in metadata of image data.

Referring to a reference number 1005, according to various embodiments, the electronic device 201 may display an indicator 1017 indicating occurrence of the additional information together with navigation 1015. For example, the electronic device 201 may notify a user of the occurrence direction of additional information by displaying the indicator 1017 at a periphery of the navigation 1015 in the direction in which the additional information is generated.

Figure 11:
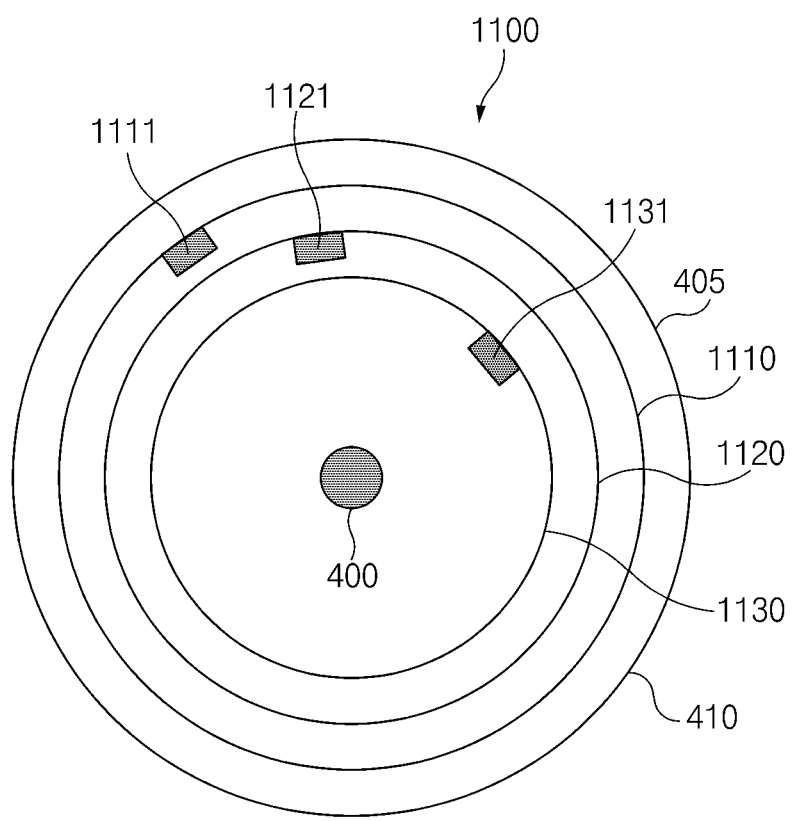
FIG. 11 is a configuration diagram of additional information according to various embodiments.

FIG. 11 is a configuration diagram 1100 of additional information according to various embodiments.

According to various embodiments, an electronic device (e.g., the electronic device 201 in FIG. 3) may map additional information on a plurality of layers. According to an embodiment, the electronic device 201 may map first additional information 1111 onto a first layer 1110. According to an embodiment, the electronic device 201 may map second additional information 1121 onto a second layer 1120. According to an embodiment, the electronic device 201 may map third additional information 1131 onto a third layer 1130. According to an embodiment, the first layer 1110, the second layer 1120, and the third layer 1130 may have different depths from each other.

According to various embodiments, the first additional information 1111, the second additional information 1121, and the third additional information 1131 may have different display attributes.

According to an embodiment, the electronic device 201 may display first additional information 1111 at the fixed position of the first layer 1110 or the projection layer 410. According to an embodiment, the electronic device 201 may display the first additional information 1111 at a location corresponding to the specific direction of image data. For example, the first additional information 1111 may be a narration in which a talker does not appear in the entire image. According to an embodiment, the electronic device 201 may display the first additional information 1111 to the fixed location by mapping the first additional information 1111 on the projection layer 410 without a separate layer (e.g., the first layer 1110).

According to an embodiment, the electronic device 201 may display the second additional information 1121 in a specific region of the display device 260 regardless of a change of the viewing region of the user 400. For example, the second additional information 1121 may be a person's dialogue or broadcast real-time text. According to an embodiment, the electronic device 201 may display the second additional information 1121 at the fixed location within the viewing region, by changing the mapping location of the second additional information 1121 on the second layer 1120 depending on the change of field of view.

According to an embodiment, the electronic device 201 may display the third additional information 1131 on the third layer 1130 moving in a viewing region or in a specific region of the display device 260, regardless of a change in field of view. For example, the third additional information 1131 may be breaking news. For example, the electronic device 201 may move and/or rotate the third additional information 1131 from a specific location in the viewing region to a specific location.

The method of displaying additional information described with reference to FIG. 11 may be performed in a manner associated with an RoI. For example, the electronic device 201 may display the additional information of an RoI depending on the additional information displaying methods of FIG. 11. For another example, the electronic device 201 may display the additional information depending on the additional information displaying methods of FIG. 11 regardless of an RoI.

Figure 12:
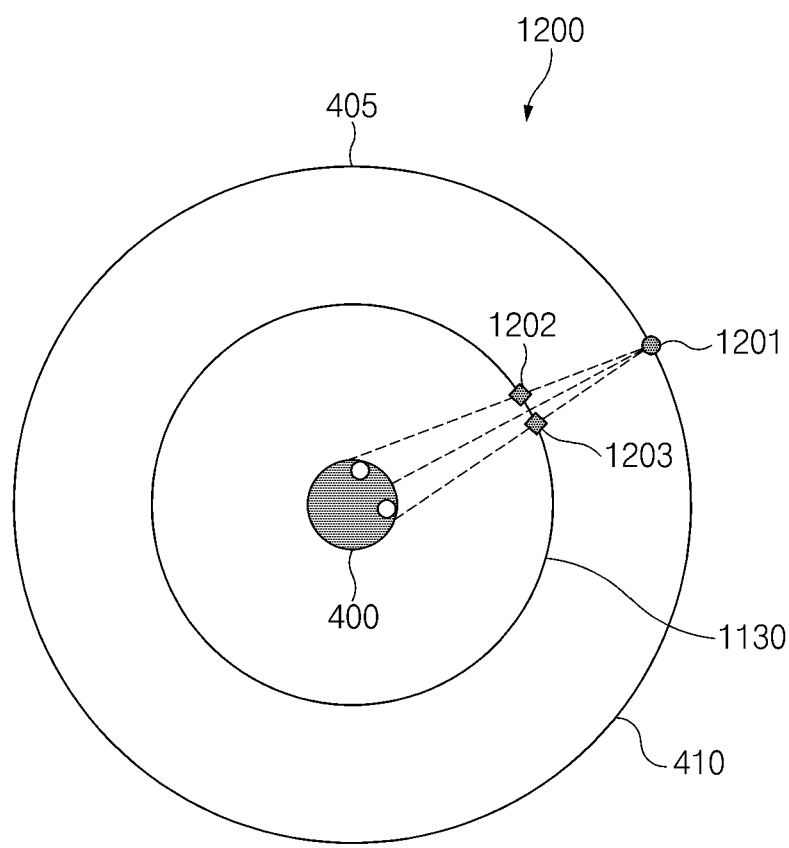
FIG. 12 illustrates a 3D display method of additional information according to various embodiments.

FIG. 12 illustrates a 3D display method of additional information according to various embodiments.

Referring to a top view 1200 of FIG. 12, according to various embodiments, an electronic device (e.g., the electronic device 201 in FIG. 3) may display additional information to have a specified depth in a 3D space. According to an embodiment, the electronic device 201 may determine a depth at which the additional information is displayed, based at least on a distance between a point of observation and a layer in which the additional information is to be displayed. For example, the electronic device 201 may display the additional information at a point corresponding to a first point 1201 on the third layer 1130. According to an embodiment, the electronic device 201 may generate a left-eye image and a right-eye image of the additional information, based at least on a second point 1202 corresponding to the left-eye gaze of a viewer 400 and a third point 1203 corresponding to the right-eye gaze of the viewer 400 on the third layer 1130. The viewer 400 may watch an image of the additional information having a specified depth, based on the binocular parallax according to the left-eye image and the right-eye image.

Figure 13:
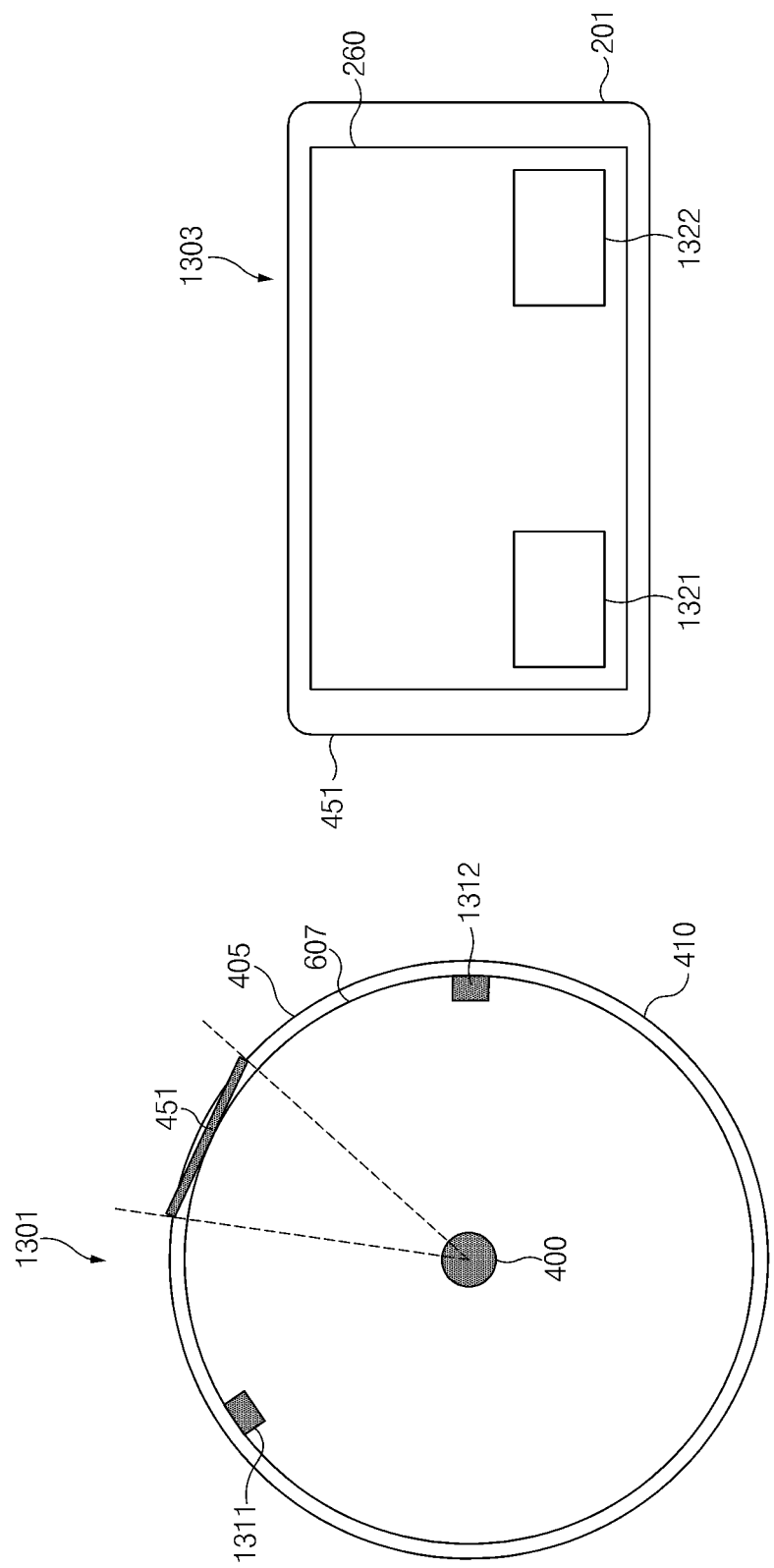
FIG. 13 illustrates a method for displaying an RoI according to various embodiments.

FIG. 13 illustrates a method for displaying an RoI according to various embodiments.

According to various embodiments, referring to a reference number 1303, the electronic device 201 may display at least one view port 1321 or 1322 on the viewing region 451. For example, the view ports 1321 and 1322 may include the shrunk images of RoIs 1311 and 1321 indicated by a reference numeral 1301, respectively.

According to an embodiment, the electronic device 201 may display the first view port 1321 in the viewing region 451 as additional information about the first RoI 1311. For example, when a distance between the viewing region 451 and the first RoI 1311 is equal to or greater than a specified distance, the electronic device 201 may display the first view port 1321 including the image for the first RoI 1311, in the viewing region 451. For example, when the distance between the viewing region 451 and the first RoI 1311 is less than the specified distance, the electronic device 201 may not display the first view port 1321 in the viewing region 451.

According to an embodiment, the electronic device 201 may display the second view port 1322 in the viewing region 451 as additional information about the second RoI 1312. For example, similarly to the first view port 1321, the electronic device 201 may display the second view port 1322 based on the distance between the viewing region 451 and the second RoI 1312.

According to an embodiment, the electronic device 201 may display the view port 1321 or 1322 corresponding to the RoI 1311 or 1312 based on the relative direction and distance between the viewing region 451 and the RoI. For example, referring to the reference number 1301, the first RoI 1311 may be located to be adjacent to the left side of the viewing region 451; and thus, referring to the reference number 1303, the electronic device 201 may display the first view port 1321 on the left side of the viewing region 451. According to an embodiment, the electronic device 201 may select one of a plurality of view port locations specified, based on the location of the RoI 1311 or 1312. According to an embodiment, the location of the view port 1321 or 1322 associated with the RoI 1311 or 1312 may be included in metadata.

The number, location, and shape of the view port 1321 or 1322 illustrated in FIG. 13 are exemplary, and the number, location, and shape of the view port 1321 or 1322 are not limited thereto. According to an embodiment, the electronic device 201 may display the first view port 1321 and the second view port 1322 in upper and lower portions in the same direction (e.g., a left or right side) of the viewing region 451, respectively. According to an embodiment, the electronic device 201 may display one or more view ports. According to an embodiment, the electronic device 201 may divide the viewing region 451 into a plurality of regions, and may display a view port in a region corresponding to an associated RoI among the plurality of regions. For example, the electronic device 201 may display the view port at the top end, middle end, or bottom end of the viewing region 451, depending on the location of the RoI associated with the view port. For example, the electronic device 201 may display the view port at the left side, right side, or center of the viewing region 451, depending on the location of the RoI associated with the view port. For example, the electronic device 201 may display at least one view port at the right top end, right center end, right left end, center top end, center bottom end, left top end, left center end, and/or left bottom end of the viewing region 451. The location of the above-described view port is exemplary, and the electronic device 201 may display a view port at an arbitrary location of the viewing region 451.

Figure 14:
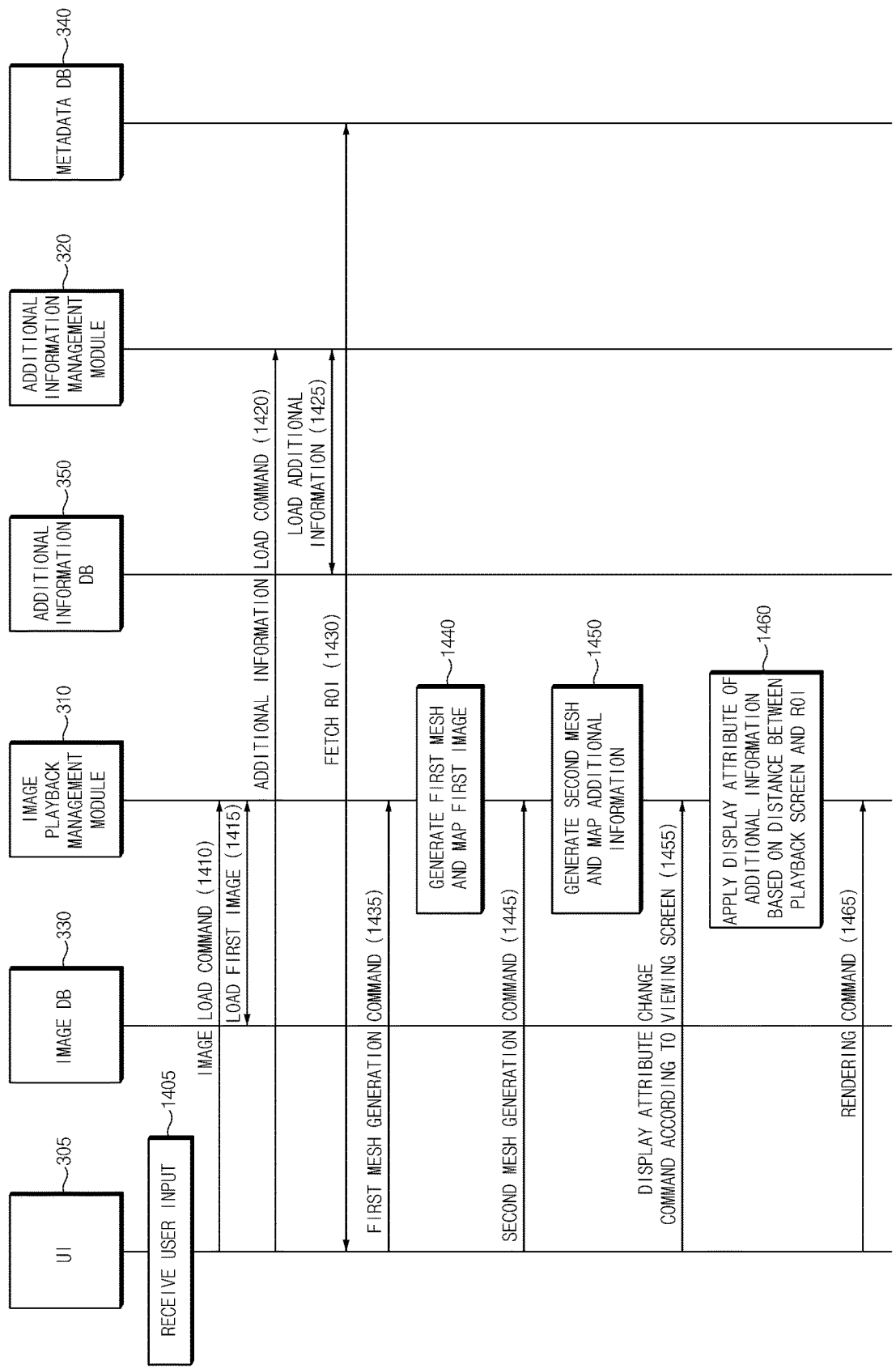
FIG. 14 is a flowchart of a method of displaying additional information according to various embodiments.

FIG. 14 is a flowchart of a method of displaying additional information according to various embodiments.

In operation 1405, according to various embodiments, an electronic device (e.g., the electronic device 201 in FIG. 3) may receive a user input through the user interface (UI) 305. For example, the user input may be an input corresponding to image playback. For example, the user input may include at least one of a direction change (e.g., tilting) of the electronic device 201 by a sensor (e.g., a gyro sensor and/or accelerometer), an input (e.g., an input to the input interface 225) to an external electronic device (e.g., the HID device 221 of FIG. 2), or a voice input.

In operation 1410, according to various embodiments, the UI 305 may deliver an image load command to the image playback management module 310. For example, the image load command may include an identifier for an image. In operation 1415, according to various embodiments, the image playback management module 310 may load a first image through interaction with the image DB 330. For example, the first image may be a single frame or sample of the image requested to be played.

In operation 1420, according to various embodiments, the UI 305 may deliver an additional information load command to the additional information management module 320. For example, the additional information load command may include an identifier for an image requested to be played. In operation 1425, according to various embodiments, the additional information management module 320 may load the additional information through interaction with the additional information DB 350.

According to an embodiment, operation 1420 and operation 1425 may be performed before operation 1410 and operation 1415. According to an embodiment, operation 1420 and operation 1425 may be performed in parallel with operation 1410 and operation 1415.

In operation 1430, according to various embodiments, the UI 305 may fetch the RoI based on the RoI information stored in the metadata DB 340. For example, the UI 305 may fetch an RoI associated with the image or the first image.

In operation 1435, according to various embodiments, the UI 305 may deliver a first mesh (e.g., the projection layer 410) generation command to the image playback management module 310. In operation 1440, according to various embodiments, the image playback management module 310 may generate a first mesh and may map the first image loaded onto the first mesh.

In operation 1445, according to various embodiments, the UI 305 may deliver a second mesh (e.g., an RoI layer) generation command to the image playback management module 310. In operation 1446, the image playback management module 310 may receive the loaded additional information from the additional information management module 320. In operation 1450, according to various embodiments, the image playback management module 310 may generate a second mesh and may map additional information onto the second mesh.

In operation 1455, according to various embodiments, the UI 305 may deliver a display attribute change command according to the viewing screen, to the image playback management module 310. In operation 1460, the image playback management module 310 may apply the display attribute of additional information based on a distance between a playback screen (e.g., a viewing region) and an RoI. For example, the image playback management module 310 may apply various display attributes based on a specified distance.

In operation 1465, according to various embodiments, the UI 305 may deliver a rendering command to the image playback management module 310. Afterward, the image playback management module 310 may render additional information on the second mesh, to which the display attribute is applied, and the first image on the first mesh. The electronic device 201 may display the rendered image on the display device 260.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a display; a memory; and
   a processor operatively connected to the display and the memory,
   wherein the processor is configured to:
   display a partial image corresponding to a viewing region of an omnidirectional image stored in the memory, on the display;
   select a display attribute based on a distance between a region of interest (RoI) and the viewing region of the omnidirectional image;
   when the distance is equal to or greater than a specified critical distance, display first additional information associated with the RoI on the display based on the selected display attribute; and
   when the distance is less than the specified critical distance, display second additional information associated with the RoI on the display based on the selected display attribute,
   wherein the first additional information comprises at least one of first information indicating a direction of the RoI, second information indicating a location of the RoI or third information indicating a direction of the viewing region, and
   wherein the second additional information comprises detailed information of the RoI.

2. The electronic device of claim 1, wherein the processor is configured to:
   select a first display attribute when the distance between the viewing region and the RoI is equal to or greater than the specified critical distance; and
   select a second display attribute different from the first display attribute when the distance between the viewing region and the RoI is less than the specified distance.

3. The electronic device of claim 2, the second display attribute is different from the first display attribute in at least one of brightness, a transparency, contrast, color tone, color space, color, a shape, or size.

4. The electronic device of claim 2, the second display attribute is different in information amount from the first display attribute.

5. The electronic device of claim 1, wherein the processor is configured to:
   obtain information about the Rot the first additional information and the second additional information from metadata of the omnidirectional image.

6. The electronic device of claim 1, wherein the processor is configured to:
   map the omnidirectional image onto a first layer and map the first additional information and the second additional information onto a second layer,
   wherein a depth of the first layer is different from a depth of the second layer.

7. The electronic device of claim 6, wherein the first layer and the second layer are spherical layers.

8. The electronic device of claim 7, wherein the processor is configured to:
   obtain the distance between the RoI and the viewing region, based at least on an angle between a first normal line of the RoI and a second normal line of the viewing region.

9. The electronic device of claim 1, the first additional information includes a shrunk image of the RoI.

10. The electronic device of claim 1, wherein the processor is configured to:
when the distance between the RoI and the viewing region is equal to or greater than a specified second distance, display the first additional information in the viewing region before a time of occurrence of the RoI.

11. The electronic device of claim 10, wherein the first additional information displayed before the time of the occurrence of the RoI includes information indicating the time of the occurrence of the RoI.

12. An additional information displaying method of an electronic device, the method comprising:
displaying a partial image corresponding to a viewing region in an omnidirectional image stored in a memory of the electronic device, on a display of the electronic device;
selecting a display attribute based on a distance between an RoI and the viewing region of the omnidirectional image; and
when the distance is equal to or greater than a specified critical distance, displaying first additional information associated with the RoI on the display based on the selected display attribute; and
when the distance is less than the specified critical distance, displaying second additional information associated with the RoI on the display based on the selected display attribute,
wherein the first additional information comprises at least one of first information indicating a direction of the RoI, second information indicating a location of the RoI or third information indicating a direction of the viewing region, and
wherein the second additional information comprises detailed information of the RoI.

13. The method of claim 12, wherein the selecting of the display attribute includes:
selecting a first display attribute when the distance between the viewing region and the RoI is equal to or greater than the specified distance; and
selecting a second display attribute different from the first display attribute when the distance between the viewing region and the RoI is less than a specified distance.

14. The method of claim 13, wherein the second display attribute is different from the first display attribute in at least one of brightness, a transparency, contrast, color tone, color space, color, a shape, or size.

15. The method of claim 13, wherein the second display attribute is different in information amount from the first display attribute.

16. The method of claim 12, further comprising:
obtaining information about the RoI, the first additional information and the second additional information from metadata of the omnidirectional image.

17. The method of claim 12, further comprising:
mapping the omnidirectional image onto a first layer and map the first additional information and the second additional information onto a second layer,
wherein a depth of the first layer is different from a depth of the second layer.

18. The method of claim 17, wherein the first layer and the second layer are spherical layers.

19. The method of claim 18, further comprising:
obtaining the distance between the RoI and the viewing region, based at least on an angle between a first normal line of the RoI and a second normal line of the viewing region.

20. The method of claim 12, the first additional information includes a shrunk image of the RoI.

* * * * *